United States Patent
Kontkanen

(10) Patent No.: US 9,773,022 B2
(45) Date of Patent: Sep. 26, 2017

(54) DISPLAYING OBJECTS BASED ON A PLURALITY OF MODELS

(71) Applicant: Google Inc., Mountain View, CA (US)

(72) Inventor: Janne Matias Kontkanen, San Francisco, CA (US)

(73) Assignee: Google Inc., Mountain View, CA (US)

(*) Notice: Subject to any disclaimer, the term of this patent is extended or adjusted under 35 U.S.C. 154(b) by 46 days.

(21) Appl. No.: 14/877,368

(22) Filed: Oct. 7, 2015

(65) Prior Publication Data

US 2017/0103091 A1   Apr. 13, 2017

(51) Int. Cl.
| | | |
|---|---|---|
| G06K 9/46 | (2006.01) | |
| G06F 17/30 | (2006.01) | |
| G06K 9/00 | (2006.01) | |

(52) U.S. Cl.
CPC ... G06F 17/30256 (2013.01); G06K 9/00677 (2013.01)

(58) Field of Classification Search
CPC ............ G06F 17/30256; G06F 17/153; G06K 9/00677; G06K 9/6203; G06K 9/4609; G06K 9/4671; G06K 9/6202
USPC ........ 382/100, 151, 189, 190, 216; 345/418, 345/419; 348/E13.004, E13.008
See application file for complete search history.

(56) References Cited

U.S. PATENT DOCUMENTS

| | | |
|---|---|---|
| 6,697,062 B1 | 2/2004 | Cabral et al. |
| 7,085,409 B2 | 8/2006 | Sawhney et al. |
| 2002/0061131 A1 | 5/2002 | Sawhney et al. |
| 2013/0057644 A1 | 3/2013 | Stefanoski et al. |
| 2013/0127988 A1 | 5/2013 | Wang et al. |
| 2014/0320535 A1 | 10/2014 | Ying |
| 2015/0043636 A1 | 2/2015 | Jung et al. |

FOREIGN PATENT DOCUMENTS

WO   0245001 A1   6/2002

OTHER PUBLICATIONS

Paul Debevec et al., View-dependent image-based rendering with projective texture—Mapping in: "Rendering Techniques '98", Jan. 1, 1998 (Jan. 1, 1998), Springer Vienna, Vienna, XP55164217, ISSN: 0946-2767 ISBN: 978-3-70-916453-2 pp. 105-116, DOI: 10.1007/978-3-7091-6453-2 10.*

Brian Curless and Marc Levoy; A Volumetric Method for Building Complex Models from Range Images; Stanford University; 1996; 10 pages.

Chris Buehler; Michael Bosse; Leonard McMillan; Steven Gortler; Michael Cohen; Unstructured Lumigraph Rendering; 2001; 8 pages.

(Continued)

*Primary Examiner* — Sheela C Chawan
(74) *Attorney, Agent, or Firm* — Lerner, David, Littenberg, Krumholz & Mentlik, LLP

(57) ABSTRACT

A system and method is provided for displaying surfaces of an object from a vantage point different from the vantage point from which imagery of the object was captured. In some aspects, imagery may be generated for display by combining visual characteristics from multiple source images and applying greater weight to the visual characteristics of some of the source images relative to the other source images. The weight may be based on the orientation of the surface relative to the location from which the image was captured and the location from which the object will be displayed.

20 Claims, 5 Drawing Sheets

(56) References Cited

OTHER PUBLICATIONS

Kari Pulli; Michael Cohen; Tom Duchamp; Hugues Hoppe; Linda Shapiro; Werner Stuetzle; View-Based Rendering: Visualizing Real Objects from Scanned Range and Color Data; 1997; 13 pages.
Ned Greene and Paul Heckbert; Creating Raster Omnimax Images from Multiple Perspective Views Using the Elliptical Weighted Average Filters; New York Institute of Technology; 1986; 7 pages.
Paul S. Heckbert; Fundamentals of Texture Mapping and Image Warping; Jun. 17, 1989; 94 pages.
Per H. Christensen; David M. Laur; Julian Fong; Wayne L. Wooten; Dana Batali; Ray Differentials and Multiresolution Geometry Caching for Distribution Ray Tracing in Complex Scenes; Eurographics 2003 / P. Burnet and D. Fellner; 10 pages; vol. 22 (2003), No. 3.
Renato Pajarola; Miguel Sainz and Yu Meng; DMESH: Fast Depth-Image Meshing and Warping: Jul. 31, 2003, 29 pages.
Steven Maxwell Seitz; Image-Based Transformation of Viewpoint and Scene Appearance; University of Wisconsin—Madison; 1997; 28 pages.
William R. Mark; Post-Rendering 3D Image Warping: Visibility, Reconstructions, and Performance for Depth-Image Warping; Apr. 21, 1999; 13 pages.

Akash Kushal et al: "Modeling 3D Objects from Stereo Views and Recognizing Them in Photographs", Computer Vision—ECCV 2006 Lecture Notes in Computer Science; LNCS, Springer, Berlin, DE, vol. 3952, Jan. 1, 2006 (Jan. 1, 2006), pp. 563-574, XP019036468, ISBN: 978-3-540-33834-5.
Invitation to Pay Additional Fees and Communication Relating to the Results of the Partial International Search for PCT Application No. PCT/US2016/055323, dated Dec. 2, 2016.
Narayanan, P. J. et al: "Virtual worlds using computer vision", Computer Vision for Virtual Reality Based Human Communications, 1998. Proceedings, 1998 IEEE and ATR Workshop on Bombay, India Jan. 3, 1998, Los Alamitos, CA, USA, IEEE Comput. Soc, US, Jan. 1, 1998 (Jan. 1, 1998), pp. 2-13, XP010270950, DOI: 10.1109/CVVRHC.1998.660365, ISBN: 978-0-8186-8283-4.
Paul Debevec et al.: "Efficient View-Dependent Image-Based Rendering with Projective Texture-Mapping" in: "Rendering Techniques '98", Jan. 1, 1998 (Jan. 1, 1998), Springer Vienna, Vienna, XP55164217, ISSN: 0946-2767 ISBN: 978-3-70-916453-2 pp. 105-116, DOI: 10.1007/978-3-7091-6453-2_10.
International Search Report and Written Opinion for PCT Application No. PCT/US2016/055323, dated Jan. 23, 2017.

\* cited by examiner

DISPLAYING OBJECTS BASED ON A PLURALITY OF MODELS

BACKGROUND OF THE INVENTION

Certain panoramic images of objects are associated with information relating to the geographic location and orientation from which the image was captured. For example, each pixel of the image may be associated with data that identifies the angle from the geographic location from which the image was captured to the portion of the surface of an object (if any) whose appearance is represented by the visual characteristics of the pixel. Each pixel may also be associated with depth data that identifies the distance from the capture location to the portion of the surface represented by the pixel.

Three-dimensional models of the locations of surfaces appearing in the images may be generated based on the depth data. The models may include polygons whose vertices correspond with the surface locations. The polygons may be textured by projecting visual characteristics of the panoramic image onto the model using ray tracing. A user may select a vantage point from which the models may be displayed to the user.

BRIEF SUMMARY OF THE INVENTION

Aspects of the disclosure provide a system that includes one or more processors, memory storing a model of the orientation and visual characteristics of the surface of an object relative to vantage points, and instructions executable by the one or more processors. The visual characteristics may include a first set of visual characteristics representing the appearance of the surface from a first vantage point and a second set of visual characteristics representing the appearance of the surface from a second vantage point. The instructions may include: receiving a request for an image of the object from a requested vantage point different from the first vantage point and the second vantage point; identifying a first visual characteristic from the first set of visual characteristics and a second visual characteristic from the second set of visual characteristics; determining a first weight value for the first visual characteristic based on the orientation of the surface relative to the requested vantage point and the first vantage point; determining a second weight value for the second visual characteristic based on the orientation of the surface relative to the requested vantage point and the second vantage point; determining a visual characteristic of the requested image based on the first and second visual characteristics and the first and second weight values; and providing the requested image.

Aspects of the disclosure also provide a method of providing an image for display. The method may include: receiving a request for an image of an object from a requested vantage point; accessing a model of the orientation and visual characteristics of the surface of the object relative to vantage points, where the visual characteristics include a first set of visual characteristics representing the appearance of the surface from a first vantage point and a second set of visual characteristics representing the appearance of the surface from a second vantage point, the first and second vantage points being different from the requested vantage point; identifying a first visual characteristic from the first set of visual characteristics and a second visual characteristic from the second set of visual characteristics; determining a first weight value for the first visual characteristic based on the orientation of the surface relative to the requested vantage point and the first vantage point; determining a second weight value for the second visual characteristic based on the orientation of the surface relative to the requested vantage point and the second vantage point; determining a visual characteristic of the requested image based on the first and second visual characteristics and the first and second weight values; and providing the requested image for display.

Aspects of the disclosure further provide a non-transitory computing-device readable storage medium on which computing-device readable instructions of a program are stored. The instructions, when executed by one or more computing devices, may cause the one or more computing devices to perform a method that includes: receiving a request for an image of an object from a requested vantage point; accessing a model of the orientation and visual characteristics of the surface of the object relative to vantage points, where the visual characteristics comprise a first set of visual characteristics representing the appearance of the surface from a first vantage point and a second set of visual characteristics representing the appearance of the surface from a second vantage point, and where the first and second vantage points are different from the requested vantage point; identifying a first visual characteristic from the first set of visual characteristics and a second visual characteristic from the second set of visual characteristics; determining a first weight value for the first visual characteristic based on the orientation of the surface relative to the requested vantage point and the first vantage point; determining a second weight value for the second visual characteristic based on the orientation of the surface relative to the requested vantage point and the second vantage point; determining a visual characteristic of the requested image based on the first and second visual characteristics and the first and second weight values; and providing the requested image for display.

DETAILED DESCRIPTION

Overview

The technology relates to displaying an object from a vantage point that is different from the vantage point from which imagery of the object was captured. For instance, two or more panoramic images may capture an object from two different vantage points, and a user may request an image of the object from a location between the two capture points. The system may generate the user-requested image by blending corresponding fragments of the images together in proportion to the likelihood of the fragment being a visually-accurate representation of the corresponding surface of the object. By way of example, when generating the user-requested image, the system may calculate a quality value that is based on the relationship of the capture location and user-requested point to the orientation of the surface of the object to be displayed. When the fragments are blended, more weight may be applied to fragments having better quality values than the other fragments.

Figure 2:
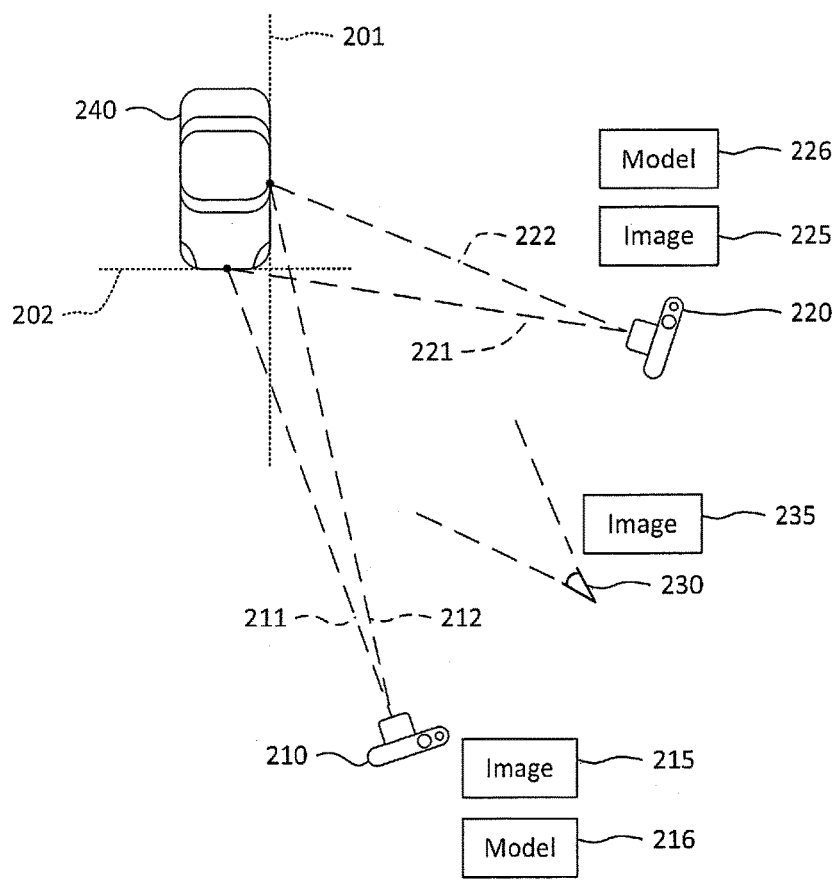
FIG. 2 is a diagram of an object relative to vantage points from which the object may be captured and displayed.

By way of illustration, FIG. 2 shows two different vantage points from which two source images of a car were captured. In this example, the angle from which the front of the car is captured is relatively orthogonal in the first source image and relatively acute in the second source image. Conversely, the angle from which the side of the car is captured is relatively acute in the first image and relatively orthogonal in the second image. The figure also shows a vantage point selected by a user to view the car.

In order to display the object from the user-selected vantage point, the system may generate a three-dimensional (3D) model of all of the surfaces captured in each source image. For instance, a laser range finder may have been used to prepare a depth map, which was in turn used to prepare a source model that includes a mesh of polygons whose vertices correspond with the locations of points along the surfaces of the object.

The source model associated with each source image may also identify the location of the capture point relative to the model, and the system may use that location to project the visual information captured in the source image onto the model. The 3D model associated with one source image may be substantially identical to the 3D model associated with another source image with respect to surface locations, but the visual characteristics of textures projected onto the models may be different depending on the angle from which the surfaces was captured.

When determining the visual characteristics of the pixels of the image to be displayed to the user, the system may use ray tracing and the location of the user-requested vantage point to identify the location at which a ray extending through each displayed pixel intersects the textures of the model, e.g., a texel. The system may blend the texels from the different source images together to determine the visual characteristics of the displayed pixel (e.g., hue, saturation and brightness).

When the texels from the source images' models are blended together, greater weight may be applied to the texel from one source image over a texel from another source image. The weight may be based on a quality value that reflects the likelihood of the texel being an accurate representation of the visual characteristics of object to be displayed.

In at least one aspect, the quality value may depend on the resolution of the displayed pixels relative to the resolution of the texels. For instance, optimum quality may be defined to occur when there is a single texel for each displayed pixel. Conversely, low quality may be defined to occur when there are many texels associated with a single pixel (which may occur when a texture of a surface was captured straight on but is viewed at a grazing angle) or there are many pixels associated with a single texel (which may occur if the texture of a surface was captured at a grazing angle but is viewed straight on).

Figure 3:
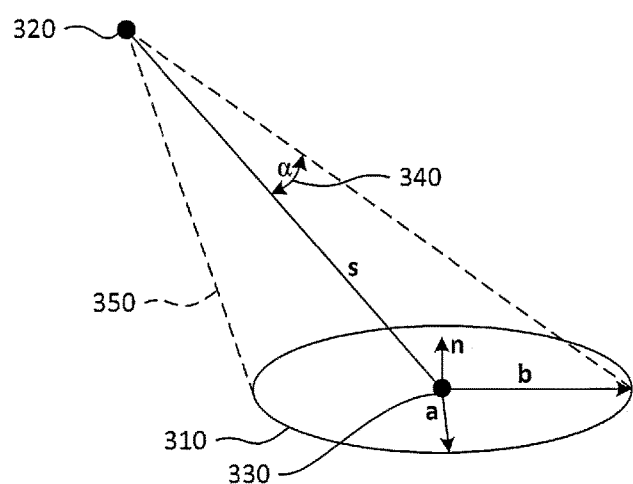
FIG. 3 is a diagram of an ellipse that is generated based a vantage point and the orientation of a surface.

The quality value of a texel may be calculated based on the location of the user-defined and capture vantage points relative to the orientation of the surface to be displayed. By way of illustration, FIG. 3 shows the location of two points: a vantage point and a point on the surface of the model to be displayed to the user. The figure also shows an ellipse representing the intersection of a cone and a plane. The plane reflects the orientation of the surface relative to the vantage point, e.g., a plane defined by the vertices of the source model polygon containing the texel. The cone is centered on a line extending from the vantage point to the surface point (the "vantage/surface line"). The extent to which the ellipse is stretched is related to the orientation of the surface and the angle from which the surface is viewed from the vantage point. If the vantage/surface line is perfectly orthogonal to the orientation of the surface, the ellipse will be a circle. As the solid angle of the vantage/surface line becomes more acute relative to the orientation of the surface, the ellipse will become more stretched and the ratio of the ellipse's major axis relative to the minor axis will increase.

Figure 4:
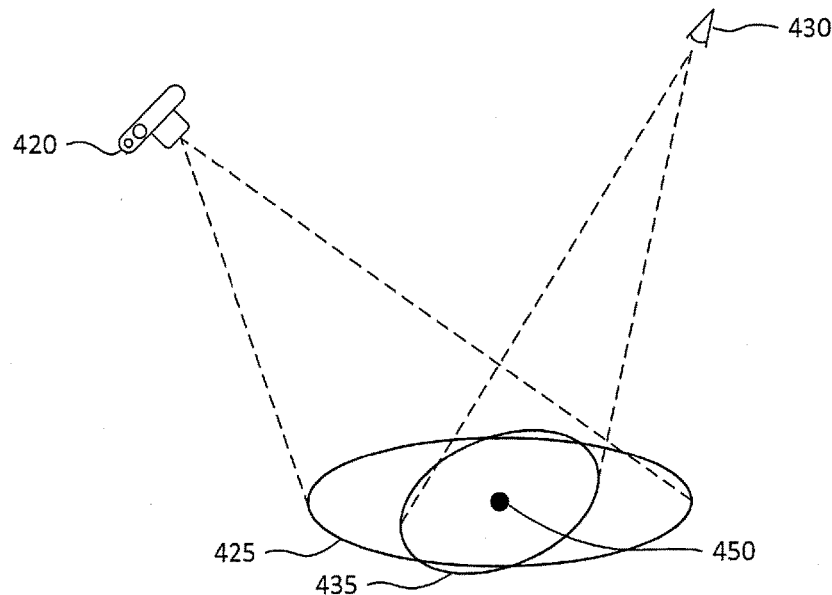
FIG. 4 is a diagram of a texel ellipse and a pixel ellipse.

The quality value of a texel may be determined based on the differences between an ellipse associated with the capture point (the "texel ellipse") and an ellipse associated with the user-requested vantage point (the "pixel ellipse"). FIG. 4 provides an example of a texel ellipse and a pixel ellipse. The quality value may be calculated from the ratio of the radius of the pixel ellipse relative to the radius of the texel ellipse at an angle that yields the greatest difference in length between the two radii.

Once the quality value has been calculated for each texel, the quality value may be applied as weights during blending. For instance, if three source images were used to identify three texels $T_1$, $T_2$ and $T_3$, the output may be calculated as $(w_1 T_1 + w_2 T_2 + w_3 T_3)/(w_1 + w2 + w3)$, where $w_n$ is equal to the quality value of the texel. The weights may also be applied in other ways.

Figure 5:
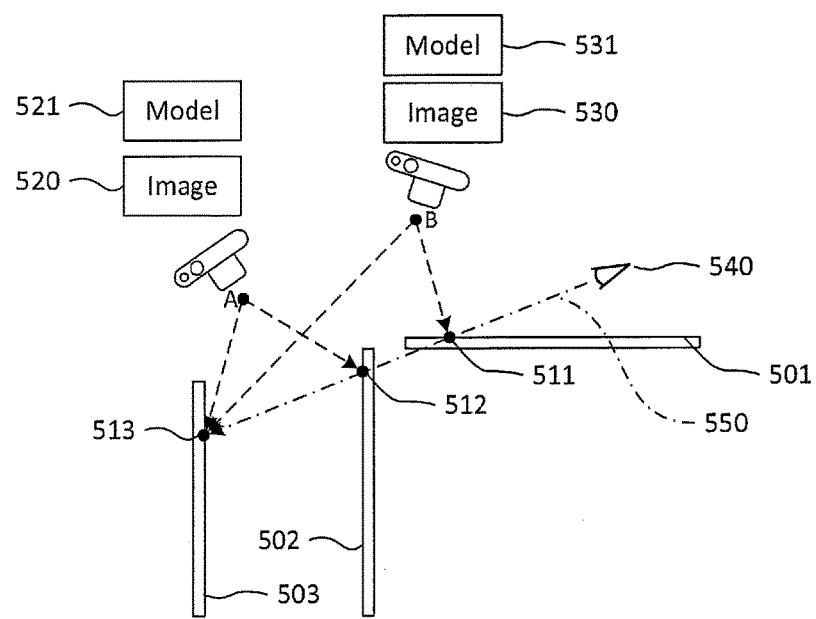
FIG. 5 is a diagram of an occluded surface relative to vantage points from which the object may be captured and displayed.

The system may also use weight values to address occlusion. As shown in FIG. 5, a ray used to determine the characteristics of a displayed pixel may extend through surfaces of the object that were captured in the source images but would be obstructed from view at the user-requested vantage point. The system may render both front and back facing surfaces such that the weight for each back facing surface is set to zero. The system may also generate the image so that the surface that is closest to the viewer within each source image is selected for display, thus allowing the system to blend textures from both models together without calculating depth.

Figure 6:
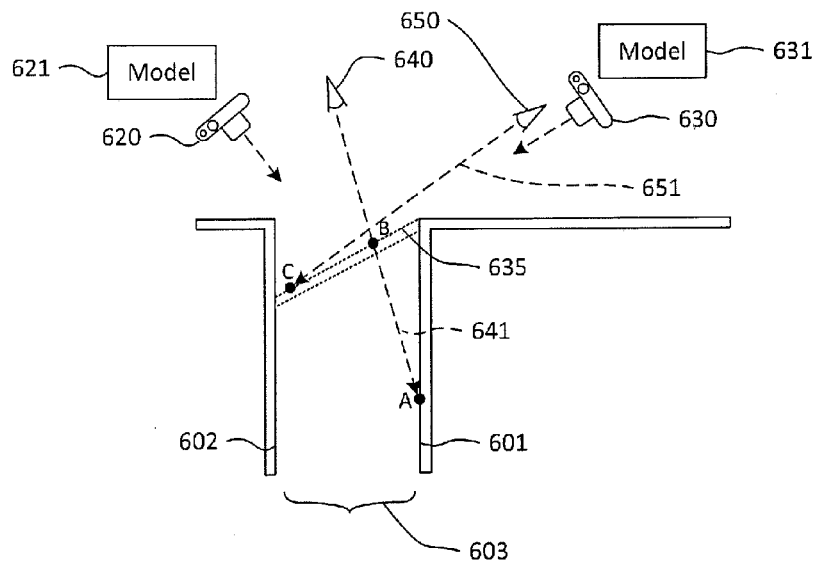
FIG. 6 is a diagram of an extraneous surface relative to vantage points from which the object may be captured and displayed.

Artifacts may also be addressed with weight values. For example and as shown in FIG. 6, discontinuities in depth data may cause gaps in surfaces to be incorrectly modeled as the surface of an object. Rather than removing such non-existent surfaces from a model, the system may determine a quality value for a texel of the non-existent surface. If the angle of the ray is relatively orthogonal to the orientation of the non-existing surface, the quality value of the texel may be very low compared to the quality value of a texel on another surface captured from a different vantage point. However, if the angle from which the non-existing surface is viewed is relatively parallel to the orientation of the non-existing surface, the quality value of the texel on that surface may be relatively high.

Figure 7:
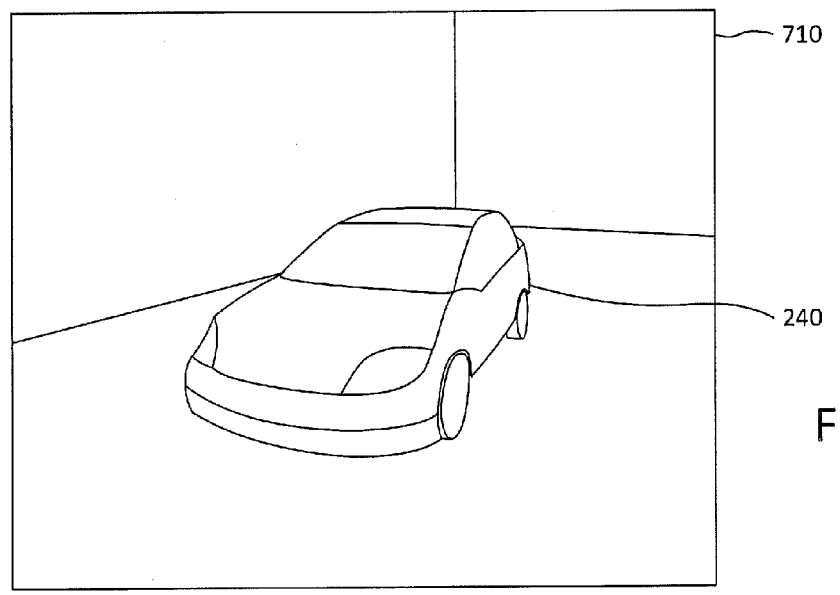
FIG. 7 is an example of an image that may be displayed to a user.

The system may be used to display the object to the user from the vantage point requested by the user. In that regard and as shown in FIG. 7, a user may be able to view the object from vantage points other than the vantage points from which the source imagery was captured.

Example Systems

Figure 1:
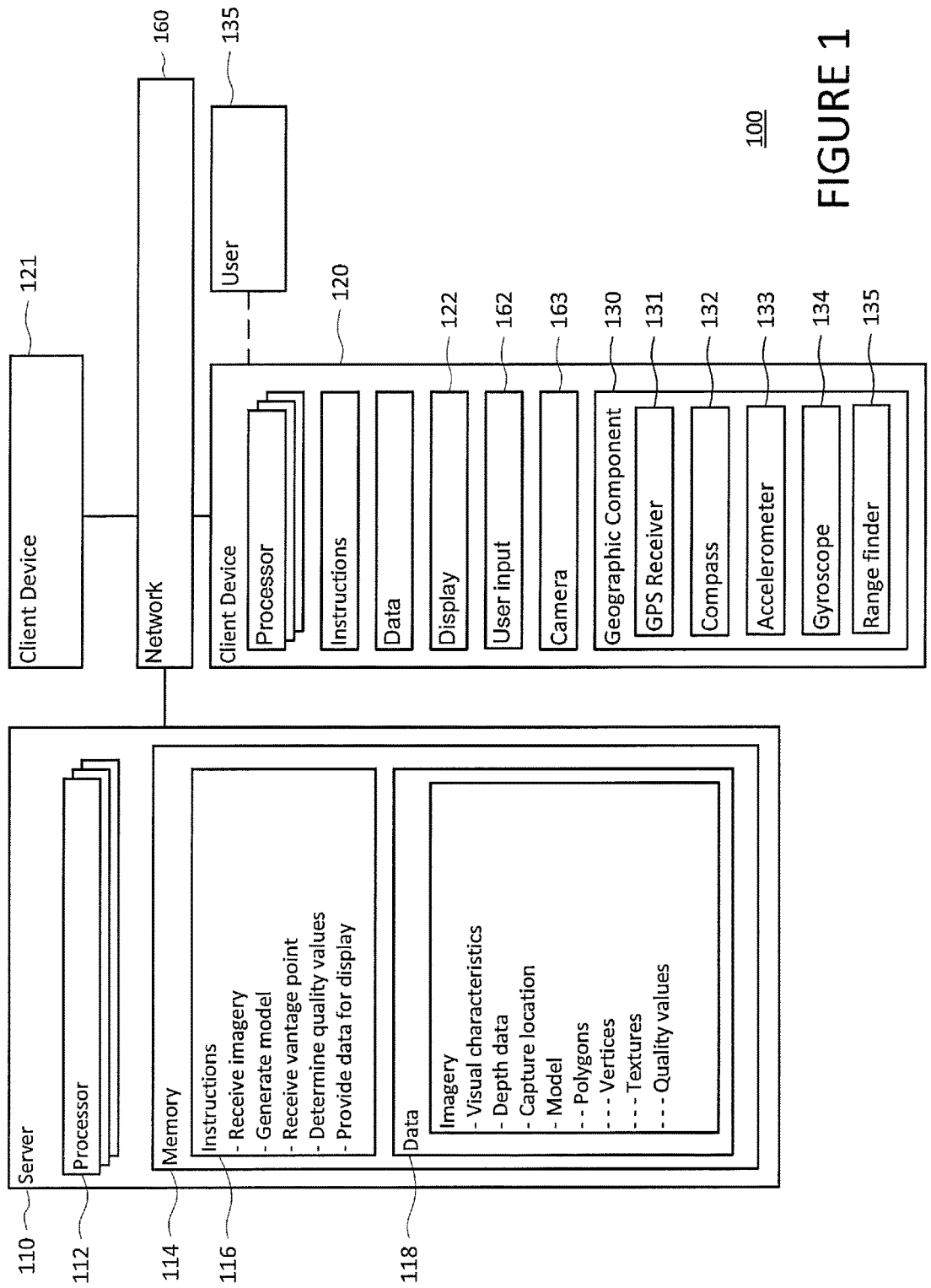
FIG. 1 is a functional diagram of a system in accordance with aspects of the disclosure.

FIG. 1 illustrates one possible system 100 in which the aspects disclosed herein may be implemented. In this example, system 100 may include computing devices 110 and 120. Computing device 110 may contain one or more processors 112, memory 114 and other components typically present in general purpose computing devices. Although FIG. 1 functionally represents each of the processor 112 and memory 114 as a single block within device 110, which is also represented as a single block, the system may include and the methods described herein may involve multiple processors, memories and devices that may or may not be stored within the same physical housing. For instance, various methods described below as involving a single component (e.g., processor 112) may involve a plurality of components (e.g., multiple processors in a load-balanced server farm). Similarly, various methods described below as involving different components (e.g., device 110 and device 120) may involve a single component (e.g., rather than device 120 performing a determination described below, device 120 may send the relevant data to device 110 for processing and receive the results of the determination for further processing or display).

Memory 114 of computing device 110 may store information accessible by processor 112, including instructions 116 that may be executed by the processor. Memory 114 may also include data 118 that may be retrieved, manipulated or stored by processor 112. Memory 114 may be any type of storage capable of storing information accessible by the relevant processor, such as media capable of storing non-transitory data. By way of example, memory 114 may be a hard-disk drive, a solid state drive, a memory card, RAM, DVD, write-capable memory or read-only memory. In addition, the memory may include a distributed storage system where data, such as data 150, is stored on a plurality of different storage devices which may be physically located at the same or different geographic locations.

The instructions 116 may be any set of instructions to be executed by processor 112 or other computing device. In that regard, the terms "instructions," "application," "steps" and "programs" may be used interchangeably herein. The instructions may be stored in object code format for immediate processing by a processor, or in another computing device language including scripts or collections of independent source code modules, that are interpreted on demand or compiled in advance. Functions, methods and routines of the instructions are explained in more detail below. Processor 112 may be any conventional processor, such as a commercially available CPU. Alternatively, the processor may be a dedicated component such as an ASIC or other hardware-based processor.

Data 118 may be retrieved, stored or modified by computing device 110 in accordance with the instructions 116. For instance, although the subject matter described herein is not limited by any particular data structure, the data may be stored in computer registers, in a relational database as a table having many different fields and records, or XML documents. The data may also be formatted in any computing device-readable format such as, but not limited to, binary values, ASCII or Unicode. Moreover, the data may comprise any information sufficient to identify the relevant information, such as numbers, descriptive text, proprietary codes, pointers, references to data stored in other memories such as at other network locations, or information that is used by a function to calculate the relevant data.

The computing device 110 may be at one node of a network 160 and capable of directly and indirectly communicating with other nodes of network 160. Although only a few computing devices are depicted in FIG. 1, a typical system may include a large number of connected computing devices, with each different computing device being at a different node of the network 160. The network 160 and intervening nodes described herein may be interconnected using various protocols and systems, such that the network may be part of the Internet, World Wide Web, specific intranets, wide area networks, or local networks. The network may utilize standard communications protocols, such as Ethernet, Wi-Fi and HTTP, protocols that are proprietary to one or more companies, and various combinations of the foregoing. As an example, computing device 110 may be a web server that is capable of communicating with computing device 120 via the network 160. Computing device 120 may be a client computing device, and server 110 may display information by using network 160 to transmit and present information to a user 135 of device 120 via display 122. Although certain advantages are obtained when information is transmitted or received as noted above, other aspects of the subject matter described herein are not limited to any particular manner of transmission of information.

Computing device 120 may be configured similarly to the server 110, with a processor, memory and instructions as described above. Computing device 120 may be a personal computing device intended for use by a user and have all of the components normally used in connection with a personal computing device such as a central processing unit (CPU), memory storing data and instructions, a display such as display 122 (e.g., a monitor having a screen, a touch-screen, a projector, a television, or other device that is operable to display information), user input device 162 (e.g., a mouse, keyboard, touchscreen, microphone, etc.), and camera 163.

Computing device 120 may also be a mobile computing device capable of wirelessly exchanging data with a server over a network such as the Internet. By way of example only, device 120 may be a mobile phone or a device such as a wireless-enabled PDA, a tablet PC, a wearable computing device or a netbook that is capable of obtaining information via the Internet. The device may be configured to operate with an operating system such as Google's Android operating system, Microsoft Windows or Apple iOS. In that regard, some of the instructions executed during the operations described herein may be provided by the operating system whereas other instructions may be provided by an application installed on the device. Computing devices in accordance with the systems and methods described herein may include other devices capable of processing instructions and transmitting data to and from humans and/or other computers including network computers lacking local storage capability and set top boxes for televisions.

Computing device 120 may include a component 130, such as circuits, to determine the geographic location and orientation of the device. For example, client device 120 may include a GPS receiver 131 to determine the device's latitude, longitude and altitude position. The component may also comprise software for determining the position of the device based on other signals received at the client device 120, such as signals received at a cell phone's antenna from one or more cell phone towers if the client device is a cell phone. It may also include a magnetic compass 132, accelerometer 133 and gyroscope 134 to determine the direction in which the device is oriented. By way of example only, the device may determine its pitch, yaw or roll (or changes thereto) relative to the direction of gravity or a plane perpendicular thereto. Component 130 may also include a laser range finder or similar device for determining the distance between the device and the surface of an object.

Server 110 may store map-related information, at least a portion of which may be transmitted to a client device. The map information is not limited to any particular format. For instance, the map data may include bitmap images of geographic locations such as photographs captured by a satellite or aerial vehicles.

Server 110 may also store imagery such as, by way of example only, a flat photograph, a photo sphere, or a video of scenery. The imagery may be captured and uploaded by end users for the purpose of making the photo accessible for later access or to anyone searching for information related to the feature. In addition to the image data captured by a camera, individual items of imagery may be associated with additional data, such as date of capture, time of day of capture, the geographic orientation (e.g., camera angle or direction) and location of capture (e.g., latitude, longitude and altitude).

Portions of the imagery may be associated with additional information, including a model of the geographic location of features that appear within the imagery. For instance, the model may identify the location of surfaces of objects captured in a panoramic image. The location of the surfaces may be stored in memory in different ways, e.g., a constellation of points whose location is defined as a solid angle and distance from a fixed location (e.g., orientations and distances from the point from which the imagery was captured) or geographically-located polygons whose vertices are expressed in latitude/longitude/altitude coordinates. The system and method may further translate locations from one reference system to another, such as generating a model of geographically-located polygons from a constellation of points whose locations were captured directly with the use of a laser-range finder or generated from images by use of stereographic triangulation. Locations may be expressed in other ways as well, and depend on the nature of the application and required precision. By way of example only, geographic locations may be identified by a street address, x-y coordinates relative to edges of a map (such as a pixel position relative to the edge of a street map), or other reference systems capable of identifying geographic locations (e.g., lot and block numbers on survey maps). A location may also be described by a range, e.g., a geographic location may be described by a range, or discrete series, of latitude/longitude/altitude coordinates.

Example Methods

Operations in accordance with a variety of aspects of the invention will now be described. It should be understood that the following operations do not have to be performed in the precise order described below. Rather, various steps can be handled in different order or simultaneously.

A geographic object may be captured by imagery from multiple vantage points. By way of example, FIG. 2 shows a car 240 that was captured in two separate images 215 and 225 from two different locations 210 and 220, respectively. From vantage point 210, the camera angle 211 to a plane 202 generally defined by the front of the car is relatively orthogonal, and the camera angle 212 to a plane 201 generally defined by the side of the car is relatively acute. In contrast, from vantage point 220, the angle of view 221 to front plane 202 is relatively acute, and the angle of view 222 to side plane 201 is relatively orthogonal. (Reference numbers 201 and 202 are used interchangeably to refer to the front and side surfaces of car 240 as well as the planes generally defined by those surfaces.) In that regard, the images captured from locations 210 and 220 capture different surfaces of the car from different angles, with one surface being captured relatively straight on and the other being captured from a sharp angle.

A model of the location of the object surfaces captured in the imagery may be generated and associated with the imagery. By way of example, the source imagery may include a panoramic image. At the time a source image was captured, laser range finder 135 or another depth-determination technique may have been used to associate each pixel of the panoramic image with the distance from the capture location to the portion of a surface whose visual characteristics are represented by the pixel. Based on such information and the location from which the image was captured (e.g., latitude/longitude/altitude information provided by GPS Received 131), the system may generate a source model that includes a mesh of polygons (e.g., triangles) whose vertices correspond with the location of points (e.g., latitude/longitude/altitude) along the surface of the object.

The visual characteristics captured in the source image may be used to texture the model associated with that source image. For example, each pixel of imagery 215 and 216 may also be associated with a camera angle, e.g., data defining a ray that extends from the camera to the portion of the surface associated with the pixel. The camera angle data may be based on information provided by geographic component 130 at the time the image was captured, such as the cardinal direction provided by compass 132 and orientation data provided by gyroscope 134. Ray tracing may be used to project the visual characteristics of each pixel of image 215 onto the polygons of model 216 such that the visual characteristics of the polygon at the point of intersection with the ray match the visual characteristics of the associated pixel.

The visual information of the polygons may be stored as textures made up of texels. By way of example only, the texels of a texture may be arranged in a manner similar to the way that pixels of an image may be arranged, e.g., a grid or other collection of individual units that define one or more visual characteristics. Portions of the following description may refer only to a single visual characteristic of a pixel or texel, such as color, for ease of explanation. However, pixels and texels may be associated with data defining many different visual characteristics including hue, saturation and brightness.

Even if two different source models include identical representations of a surface's location, the visual characteristics of the surface in each model may differ greatly. For instance, because imagery 215 captures the side 201 of car 240 at a sharp angle 212, the entire length of the side of the car may horizontally appear in only a few pixels of image 215. As a result, when the pixel information is projected onto polygons representing the side of the car, the information from a single pixel may stretch across many texels in the horizontal direction. If model 216 was displayed from vantage point 230, the side of the car may thus appear to have long horizontal streaks of colors as a result. However, if model 216 is displayed from vantage point 210 (the same location from which the textures were projected), side 201 of car 240 might be displayed with few to no artifacts.

The system may combine visual information captured from multiple vantage points to display a geographic object from still another vantage point. For example, a user may request an image 235 of car 240 from vantage point 230. When determining the visual characteristics of the pixels of the image to be displayed to the user ("displayed pixels"), the system may associate each displayed pixel with a ray that extends from the vantage point and through an image plane containing the pixel. The system may determine the point and texel at which each pixel's associated ray intersects a surface defined by the model. For instance, when determining the visual characteristics of a pixel in image 235, the system may determine the texel ($T_1$) at which the pixel's ray intersects a polygon of model 216 and the texel ($T_2$) at which the pixel's ray intersects a polygon of model 226. The system may determine the color of the pixel by alpha-blending the color of $T_1$ and the color of $T_2$.

When the visual characteristics of the intersected texels are blended together, greater weight may be applied to the texel derived from one source image over a texel derived from another source image. The weight may be based on the likelihood of the texel being an accurate representation of the visual characteristics of the object to be displayed.

In at least one aspect, the quality value may depend on the resolution of the displayed pixels relative to the resolution of the texels; optimum quality may be defined to occur when there is a single texel for each displayed pixel. Conversely, low quality may be defined to occur when there are many texels associated with a single pixel or there are many pixels associated with a single texel. By way of example, a first polygon may be generated wherein there is a single texel for each pixel projected onto it. If the pixels were projected onto the first polygon from a relatively straight-on angle, the texture may include many tightly-packed texels. If this polygon was displayed straight on, there may be roughly one texel for each displayed pixel and the texture would thus be considered to have a relatively high quality. However, if the polygon was displayed from an acute angle, there may be many texels for each displayed pixel and the texture would be considered to have a relatively low quality in spite of the texture's relatively high resolution.

By way of further example, a second polygon may be generated wherein there is also a single texel for each pixel projected onto it. However, if the pixels were projected onto the second polygon from a relatively acute angle, the texture may include long and thin texels. If this polygon is then displayed straight on, many displayed pixels would derive their characteristics from only a single texel, in which case the texture would be considered to have a relatively low quality. However, if the polygon is displayed from a relatively acute angle, there may be only one texel for each displayed pixel, in which case the texture would be considered to have a relatively high quality in spite of the texture's relatively low resolution.

The quality value of a texel may be calculated based on the location of the user-defined and capture vantage points relative to the orientation of the surface to be displayed. By way of illustration, point 320 of FIG. 3 may be the geographic location from which a geographically-located polygon of a model will be viewed. Point 330 is the point at which the camera angle associated with a displayed pixel intersects the polygon. Line "s" extends from vantage point 320 to intersection point 330. Cone 350 extends outwardly from point 320 at an acute solid angle ("a"). The measure of a may be arbitrarily selected. The measure of a may also be chosen so that the cone provides a similar solid angle as the texel as seen from the location from which the texture was captured, e.g., the higher the texture resolution, the smaller the cone. Ellipse 310 represents the intersection of cone 350 and a plane (not shown). The plane reflects the orientation of the surface at the intersection point, e.g., a plane defined by the vertices of the polygon that contains intersection point 330.

The extent to which the ellipse is stretched is related to the orientation of the surface and the vantage point. For example, if line "s" is perfectly orthogonal to the orientation of the plane (which would be associated with viewing the surface straight on), ellipse 310 would be a perfect circle. As the solid angle of line "s" becomes more acute relative to the orientation of the plane, ellipse 310 will become more stretched and the ratio of the ellipse's major axis ("b") relative to the minor axis ("a") will increase, with "n" as the surface normal. Axes "a" and "b" may be determined from the equation $a = \alpha s \times n$ and $b = (n \cdot s/|s|)(a \times n)$.

The quality value of a texel may be determined based on the differences between the ellipse associated with a cone extending from the capture location to the intersection point (the "texel ellipse") and the ellipse associated with a cone extending from the location selected by the user to the intersection point (the "pixel ellipse"). In FIG. 4, texel ellipse is associated with capture location 420 and pixel ellipse 435 is associated with user-requested vantage point 430. The quality value of the texel at intersection point 450 may be calculated from the ratio of the radius of the pixel ellipse relative to the radius of the texel ellipse at a particular angle $\theta$, e.g., $quality(\theta) = radius_t(\theta)/radius_p(\theta)$. In one aspect, angle $\theta$ is the angle, or an estimate of the angle, that yields the minimum ratio. For example, the quality value may be calculated at different values of $\theta$, and the texel's quality value may equal the lowest of the calculated values, e.g., $quality_{min} = quality\ (argmin_\theta\{quality(\theta)\})$. The minimum may be determined by expressing both ellipses in matrix form and multiplying the pixel ellipse with the inverse of the texel ellipse, which maps the pixel ellipse into a coordinate system where the texel ellipse would be a unit circle. Within this coordinate system, the ratio is equal to the remapped pixel ellipse's radius and the minimum ratio is equal to the minor axis length of the remapped pixel ellipse.

The quality value may be estimated by projecting each of the texel ellipse axes to each of the pixel ellipse axes, and selecting the pixel ellipse axes that gives the largest ratio. By way of example, a shader may approximate the minimum quality value by calculating values in accordance with the equation $quality_{min} \sim 1/\max((a_t \cdot a_p)/(a_p \cdot a_p),\ (b_t \cdot a_p)/(a_p \cdot a_p),\ (a_t \cdot b_p)/(b_p \cdot b_p),\ (b_t \cdot b_p)/(b_p \cdot b_p))$, which samples four possible directions and selects the angle associated with the lowest quality value. Other methods may also be used to calculate the quality.

Once the quality of a texel has been calculated, the quality may be used to determine how similar the displayed pixel's color will be to the texel's color. For instance, if three source images were used to identify three texels $T_1$, $T_2$ and $T_3$ the blending weight for each texel may be computed in a fragment shader for each input texel and output $(w_1 T_1 + w_2 T_2 + w_3 T_3)/(w_1 + w2 + w3)$, where $w_n$ is equal to the quality value of the texel. The weights may also be applied in other ways, such as by raising the quality values to a power. For instance, by raising the weights by a large exponent, the surface with the greatest weight may dominate the other weights, thus reducing ghosting by reducing the impact of the texels with the lower weights.

The system may also use weight values to address occlusion, as shown by way of example in FIG. 5. Surfaces 502 and 503 were captured in image 520 from vantage point A and surfaces 501 and 503 were captured in image 530 from vantage point B. A model 521 and 531 may have been generated for each image 520 and 531, respectively. When the model is generated, the model may associate the texture with a specific side of the polygon. For example, surface 502 may be represented in model 521 by a single triangle, where one side faces towards vantage point A and the other side faces away from vantage point A. When the image data is projected onto the model, the model may indicate whether the texture is on the side of the triangle facing towards the vantage point.

When generating the requested image, an occluded surface may be hidden by determining whether its associated texture faces towards or away from the requested vantage point, and by determining whether the texture is closer to the vantage point than other textures in the same model. For instance, when determining the color of a displayed pixel from vantage point 540, the system may identify all of the points at which the pixel's associated ray 550 intersects each surface, namely points 511-513. The system may also determine, for each model, the intersected texel that is closest to the vantage point and whether the texture of the intersected texture is on the side of the polygon facing towards ("front facing") or away ("back facing") from the vantage point. Thus, the system may determine that $T_{511B}$, is the closest texel in model 531 and front facing (where "$T_{pppm}$" refers to the texel that is at the point of intersection ppp and stored in the model associated with vantage point m). The system may also determine that $T_{512A}$ is the closest texel in model 521 and back facing. Because $T_{512A}$ is back facing, the system may automatically set its weight to zero. As a result, the color of the pixel associated with ray 550 may be determined by $(w_{511B}T_{511B}+w_{512A}T_{512A})/(w_{511B}+w_{512A})$, where $w_{511B}$ is the quality value determined for $T_{511B}$ and where $w_{512A}$ is set to zero. As a result, the displayed pixel's color would be the same as $T_{511B}$.

Alternatively, rather than ignoring certain textures or setting their weights to zero, their relative weights may be reduced. For example, rather than setting $w_{512A}$ to zero and ignoring $T_{513A}$ and $T_{513B}$ altogether, the back-facing texels and other texels may also be used for blending but at reduced weights.

Artifacts may also be addressed with weight values, including artifacts caused by discontinuities in depth data. For example and as shown in FIG. 6, model 621 may be associated with the image captured from location 620 and model 631 may be associated with the image captured from location 630. The gap 603 between surface 601 and 602 may be accurately represented in model 621. However, an inaccuracy arising out of the depth data retrieved at the time of capture, or some other error that occurred during generation of model 631, may result in model 631 incorrectly indicating that a surface 635 extends across gap 603. If model 631 was viewed from vantage point 640, extraneous surface 635 may have the appearance of a rubber sheet stretched from one edge of the gap to the other. In some aspects, the system may check for and remove extraneous polygons by comparing model 621 with model 631.

In other aspects, the system may use extraneous surfaces when generating an image for display. For instance, a user may request an image that displays the surfaces from vantage point 640. When determining the contribution of model 621 to the color of the pixel associated with ray 641, the system may identify point A on surface 601 as the first instruction point. The system may also determine that the texel at point A has a relatively high quality value because the texel is being viewed at an angle that is similar to the angle from which it was captured (location 620). When determining the contribution of model 631 to the color of the pixel, the system may identify point B on extraneous surface 635 as the first intersection point. The system may determine that the texel at point B has a relatively low quality value because the texel is being viewed at an angle relatively orthogonal to the angle from which it was captured (location 630). As a result, when the texels at points A and B are blended together, relatively little weight will be applied to the texel at point B; the color of the pixel will be based almost entirely on the color of point A on surface 601.

From certain angles, the extraneous surfaces may have a significant contribution to the visual characteristics of the image to be displayed. For example, a user may request an image from vantage point 650, which is relatively close to the capture location 630 of model 631. When determining the contribution of model 631 to the color of the pixel associated with ray 641, the system may identify point C on extraneous surface 635 as the first intersection point, and may further determine that the texel at point C of model 631 has a relatively high quality value. When determining the contribution of model 621 to the color of the same pixel, the system may identify no point of intersection if surface 602 is not represented by the model. Alternatively, if surface 602 is represented by the model, the quality value of the texel at the intersection point in model 621 may be relatively low because the angle from the intersection point to vantage point 650 is relatively orthogonal to the angle from the intersection point to capture location 620. In either case and as a result, the color of the displayed pixel may be substantially the same as the texel of the extraneous surface. This may be particularly advantageous if model 621 has no representation of surface 602, as displaying extraneous surface 635 may be preferable than displaying nothing (e.g., a color indicating the absence of a surface).

Users may use the system and interact with the models. By way of example only and with reference to FIG. 1, user 135 may use camera 163 and geographic component 130 of client device 120 to capture image data and depth data from multiple vantage points. User 135 may upload the image and depth data to server 110. Processor 112 may generate a textured model for each image based on the data provided by the user, and store the data in memory 114. Server 110 may then receive a request for an image of the object from a specific vantage point. For example, user 135 (or a different user using client device 121) may request a panoramic image at a specific geographic location by selecting the geographic location with user input 162 and sending the request to server 110. Upon receiving the request, server 110 may retrieve two or more models based on the requested geographic location, such as by selecting all or a limited number of the models that have capture locations or surface locations within a threshold distance of the requested geographic location. The server may then send the models to client device 120 via network 160. Upon receiving the models, the processor of client device 120 may generate a panoramic image based on the models and using the requested geographic location as the vantage point. If the requested geographic location did not include an altitude, the altitude of the vantage point may be based on the altitudes of the capture locations of the models.

The panoramic image may be displayed on display 122. For example and with reference to FIGS. 2 and 7, if models 216 and 226 of car 240 were sent to the client device, image 710 of car 240 may be generated based on vantage point 230 and displayed to the user. The user may select other vantage points that are different from the capture locations by providing commands via the user interface of the client device, e.g., pressing buttons to pan the image.

Figure 8:
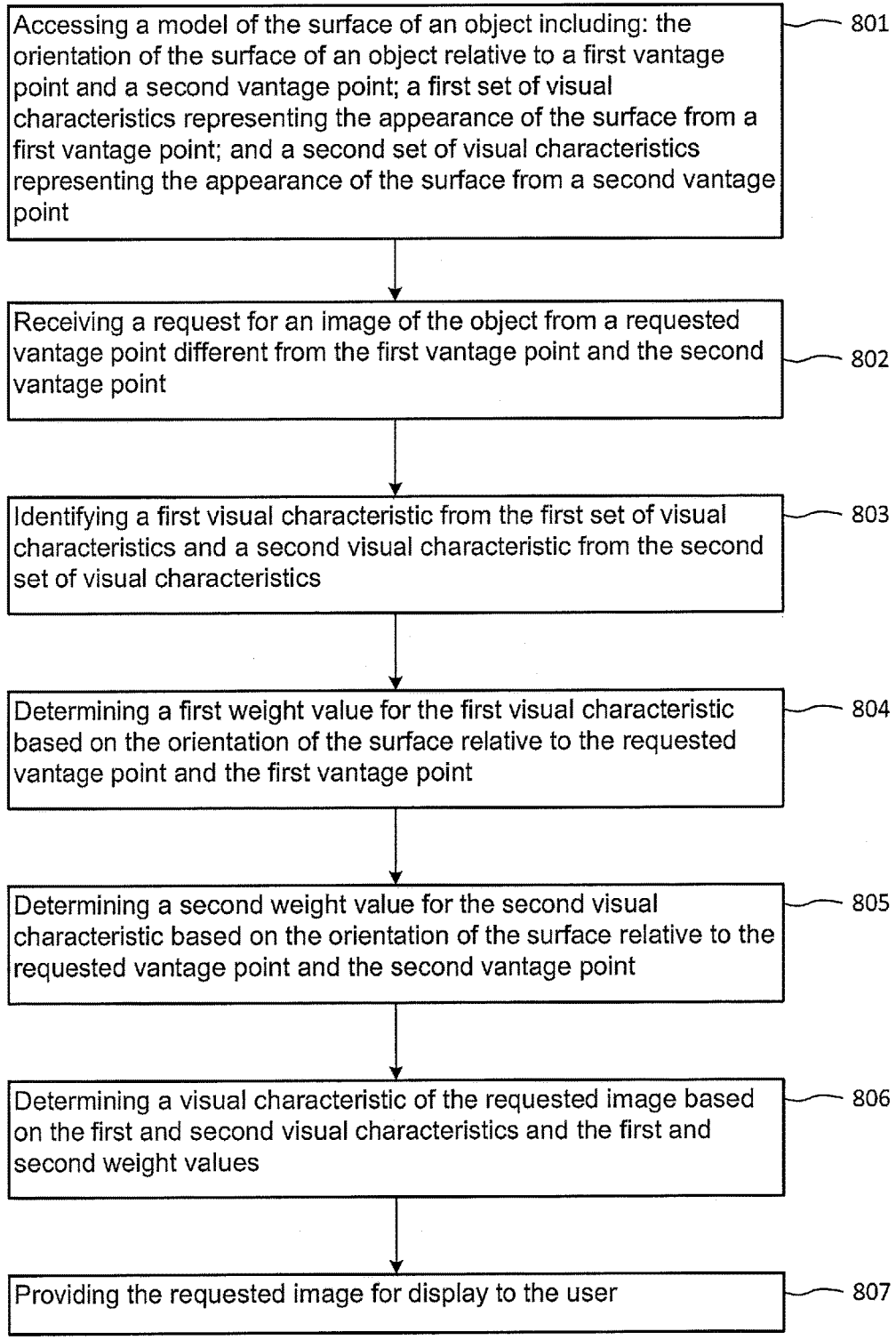
FIG. 8 is an example flow diagram in accordance with aspects of the disclosure.

FIG. 8 is a flowchart in accordance with some of the aspects described above. At block 801, a model of the surface of an object is accessed that includes: the orientation of the surface of an object relative to a first vantage point and a second vantage point; a first set of visual characteristics representing the appearance of the surface from a first vantage point; and a second set of visual characteristics representing the appearance of the surface from a second vantage point. At block 802, a request is received for an image of the object from a requested vantage point different from the first vantage point and the second vantage point. At block 803, a first visual characteristic is identified from the first set of visual characteristics and a second visual characteristic is identified from the second set of visual characteristic. At block 804, a first weight value is determined for the first visual characteristic based on the orientation of the surface relative to the requested vantage point and the first vantage point. At block 805, a second weight value is determined for the second visual characteristic based on the orientation of the surface relative to the requested vantage point and the second vantage point. At block 806, a visual characteristic of the requested image is determined based on the first and second visual characteristics and the first and second weight values. At block 807, the requested image is provided for display to the user.

As these and other variations and combinations of the features discussed above can be utilized without departing from the invention as defined by the claims, the foregoing description of the embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A system comprising:
   one or more processors,
   memory storing instructions, a first model of the orientation and visual characteristics of a surface of one or more objects relative to a first vantage point, and a second model of the orientation and visual characteristics of a surface of the one or more objects relative to a second vantage point, the first model being different from the second model and the first vantage point being different from the second vantage point, and
   the instructions, being executable by the one or more processors, comprising:
   receiving a request for an image of the one or more objects from a requested vantage point different from the first vantage point and the second vantage point;
   determining a camera angle associated with the requested vantage point;
   determining a first visual characteristic and a first orientation from the first model based on the camera angle and a second visual characteristic and a second orientation from the second model based on the camera angle,
   determining a first weight value for the first visual characteristic based on the first orientation relative to the requested vantage point and the first vantage point,
   determining a second weight value for the second visual characteristic based on the second orientation relative to the requested vantage point and the second vantage point,
   determining a visual characteristic of the requested image based on the first and second visual characteristics and the first and second weight values; and
   providing the requested image for display.

2. The system of claim 1 wherein the request is received from a user and providing the requested image comprises displaying the requested image to the user.

3. The system of claim 1 wherein determining a visual characteristic of the requested image comprises determining a visual characteristic that is more similar to the first visual characteristic than the second visual characteristic, and the degree of similarity is based on the first weight value relative to the second weight value.

4. The system of claim 3 wherein:
   the first visual characteristics is a texel generated by projecting image data captured from the first vantage point onto the first model; and
   the second visual characteristic is a texel generated by projecting image data captured from the second vantage point onto the second model.

5. The system of claim 1 wherein the visual characteristics are associated with colors, and wherein determining a visual characteristic of the requested image comprises determining a color by alpha-blending, in proportion to the first weight value relative to the second weight value, a color associated with the first visual characteristic and a color associated with the second visual characteristic.

6. The system of claim 1 wherein the orientation of the surface defines a plane and:
   the instructions further comprise selecting a point on the plane;
   determining a first weight value comprises determining a value based on the relationship of the solid angle between the plane and a line extending from the first vantage point to the selected point, and the solid angle between the plane and a line extending from the requested vantage point to the selected point; and
   determining a second weight value comprises determining a value based on the relationship of the solid angle between the plane and a line extending from the second vantage point to the selected point, and the solid angle between the plane and a line extending from the requested vantage point to the selected point.

7. The system of claim 6 wherein the instructions further comprise selecting a pixel of the requested image and determining a direction associated with the selected pixel and wherein:
   selecting a point on the plane comprises selecting the point at which the direction associated with the selected pixel intersects the plane; and
   determining a visual characteristic of the requested image comprises determining a visual characteristic of the selected pixel.

8. The system of claim 6 wherein determining a first weight value comprises determining a value based on a radius of a first ellipse and a corresponding radius of a second ellipse, wherein the first ellipse is defined by the intersection of the plane and a cone centered around a line extending from the first vantage point to the selected point, and wherein the second ellipse is defined by the intersection of the plane and a cone centered around a line extending from the requested vantage point to the selected point.

9. The system of claim 8 wherein determining a first weight value further comprises determining a ratio based on an estimate of the radius of the first ellipse relative to an estimate of the radius of the second ellipse at a selected angle.

10. A method of providing an image for display comprising:
    receiving a request for an image of an object from a requested vantage point;
    accessing a model of the orientation and visual characteristics of a surface of the object relative to vantage points, wherein the visual characteristics comprise a first set of visual characteristics representing the appearance of the surface from a first vantage point and a second set of visual characteristics representing the appearance of the surface from a second vantage point, and wherein the first and second vantage points are different from the requested vantage point;

identifying a first visual characteristic from the first set of visual characteristics and a second visual characteristic from the second set of visual characteristics, determining a first weight value for the first visual characteristic based on the orientation of the surface relative to the requested vantage point and the first vantage point, determining a second weight value for the second visual characteristic based on the orientation of the surface relative to the requested vantage point and the second vantage point, determining a visual characteristic of the requested image based on the first and second visual characteristics and the first and second weight values; and providing the requested image for display.

11. The method of claim 10 wherein the request is received from a user and providing the requested image comprises displaying the requested image to the user.

12. The method of claim 10 wherein determining a visual characteristic of the requested image comprises determining a visual characteristic that is more similar to the first visual characteristic than the second visual characteristic, and the degree of similarity is based on the first weight value relative to the second weight value.

13. The method of claim 12 wherein:
the model comprises a first model and a second model;
the first set of visual characteristics are texels generated by projecting image data captured from the first vantage point onto the first model; and
the second set of visual characteristics are texels generated by projecting image data captured from the second vantage point onto the second model.

14. The method of claim 10 wherein the visual characteristics are associated with colors, and wherein determining a visual characteristic of the requested image comprises determining a color by alpha-blending, in proportion to the first weight value relative to the second weight value, a color associated with the first visual characteristic and a color associated with the second visual characteristic.

15. The method of claim 10 wherein the orientation of the surface defines a plane and further comprising:
selecting a point on the plane;
determining a first weight value comprises determining a value based on the relationship of the solid angle between the plane and a line extending from the first vantage point to the selected point, and the solid angle between the plane and a line extending from the requested vantage point to the selected point; and
determining a second weight value comprises determining a value based on the relationship of the solid angle between the plane and a line extending from the second vantage point to the selected point, and the solid angle between the plane and a line extending from the requested vantage point to the selected point.

16. The method of claim 15 further comprising further comprising selecting a pixel of the requested image and determining a direction associated with the selected pixel, and wherein:
selecting a point on the plane comprises selecting the point at which the direction associated with the selected pixel intersects the plane; and
determining a visual characteristic of the requested image comprises determining a visual characteristic of the selected pixel.

17. A non-transitory computing-device readable storage medium on which computing-device readable instructions of a program are stored, the instructions, when executed by one or more computing devices, causing the one or more computing devices to perform a method, the method comprising:
receiving a request for an image of an object from a requested vantage point;
accessing a model of the orientation and visual characteristics of a surface of the object relative to vantage points, wherein the visual characteristics comprise a first set of visual characteristics representing the appearance of the surface from a first vantage point and a second set of visual characteristics representing the appearance of the surface from a second vantage point, and wherein the first and second vantage points are different from the requested vantage point;
identifying a first visual characteristic from the first set of visual characteristics and a second visual characteristic from the second set of visual characteristics,
determining a first weight value for the first visual characteristic based on the orientation of the surface relative to the requested vantage point and the first vantage point,
determining a second weight value for the second visual characteristic based on the orientation of the surface relative to the requested vantage point and the second vantage point,
determining a visual characteristic of the requested image based on the first and second visual characteristics and the first and second weight values; and
providing the requested image for display.

18. The storage medium of claim 17 wherein the request is received from a user and providing the requested image comprises displaying the requested image to the user.

19. The storage medium of claim 17 wherein determining a visual characteristic of the requested image comprises determining a visual characteristic that is more similar to the first visual characteristic than the second visual characteristic, and the degree of similarity is based on the first weight value relative to the second weight value.

20. The storage medium of claim 19 wherein:
the model comprises a first model and a second model;
the first set of visual characteristics are texels generated by projecting image data captured from the first vantage point onto the first model; and
the second set of visual characteristics are texels generated by projecting image data captured from second vantage point onto the second model.

* * * * *